US012770929B2

(12) United States Patent
Kwon et al.

(10) Patent No.: US 12,770,929 B2
(45) Date of Patent: Oct. 20, 2026

(54) BATTERY CELL ASSEMBLY INCLUDING BUS BAR WITH FLAME BLOCKING MEMBER AND BATTERY CELL ASSEMBLY STRUCTURE

(71) Applicant: LG ENERGY SOLUTION, LTD., Seoul (KR)

(72) Inventors: Woo-Yong Kwon, Daejeon (KR); Jong-Mo Kang, Daejeon (KR); Kyung-Woo Kim, Daejeon (KR); In-Soo Kim, Daejeon (KR); Jin-Yong Park, Daejeon (KR); Jae-Min Yoo, Daejeon (KR); Ho-June Chi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 700 days.

(21) Appl. No.: 18/267,770

(22) PCT Filed: Dec. 19, 2022

(86) PCT No.: PCT/KR2022/020739
§ 371 (c)(1),
(2) Date: Jun. 15, 2023

(87) PCT Pub. No.: WO2023/132519
PCT Pub. Date: Jul. 13, 2023

(65) Prior Publication Data

US 2024/0396158 A1 Nov. 28, 2024

(30) Foreign Application Priority Data

Jan. 7, 2022 (KR) ........................ 10-2022-0002978

(51) Int. Cl.
*H01M 10/42* (2006.01)
*H01M 4/02* (2006.01)
(Continued)

(52) U.S. Cl.
CPC ....... *H01M 10/4235* (2013.01); *H01M 4/364* (2013.01); *H01M 4/366* (2013.01);
(Continued)

(58) Field of Classification Search
CPC ............. H01M 50/178; H01M 50/211; H01M 50/383; H01M 50/394; H01M 50/505; H01M 50/507
See application file for complete search history.

(56) References Cited

U.S. PATENT DOCUMENTS

2017/0331089 A1* 11/2017 Hashimoto ......... H01M 50/291
2019/0097192 A1* 3/2019 Kim .................... H01M 50/394
(Continued)

FOREIGN PATENT DOCUMENTS

AU 2020300283 A1 12/2021
CN 106674916 A 5/2017
(Continued)

*Primary Examiner* — Brittany L Raymond
(74) *Attorney, Agent, or Firm* — Bryan Cave Leighton Paisner LLP

(57) ABSTRACT

A battery cell assembly is provided. The battery cell assembly includes at least one pouch-type battery cell including an electrode lead, a cell cover surrounding the at least one pouch-type battery cell and having a front open end or a rear open end, a bus bar connected to the electrode lead of the at least one pouch-type battery cell, a bus bar frame supporting the bus bar and covering the front open end or the rear open end of the cell cover where the electrode lead is located, and a flame blocking member including a mesh net formed of a material with high rigidity and high heat resistance coupled to a body of the bus bar.

17 Claims, 16 Drawing Sheets

(51) Int. Cl.

| | |
|---|---|
| ***H01M 4/36*** | (2006.01) |
| ***H01M 4/38*** | (2006.01) |
| ***H01M 4/525*** | (2010.01) |
| ***H01M 4/587*** | (2010.01) |
| ***H01M 10/0525*** | (2010.01) |
| ***H01M 10/0567*** | (2010.01) |
| ***H01M 10/0569*** | (2010.01) |
| ***H01M 50/105*** | (2021.01) |
| ***H01M 50/178*** | (2021.01) |
| ***H01M 50/211*** | (2021.01) |
| ***H01M 50/249*** | (2021.01) |
| ***H01M 50/30*** | (2021.01) |
| ***H01M 50/383*** | (2021.01) |
| ***H01M 50/503*** | (2021.01) |

(52) U.S. Cl.

CPC ........... *H01M 4/386* (2013.01); *H01M 4/525* (2013.01); *H01M 4/587* (2013.01); *H01M 10/0525* (2013.01); *H01M 10/0567* (2013.01); *H01M 10/0569* (2013.01); *H01M 50/105* (2021.01); *H01M 50/178* (2021.01); *H01M 50/211* (2021.01); *H01M 50/249* (2021.01); *H01M 50/383* (2021.01); *H01M 50/394* (2021.01); *H01M 50/503* (2021.01); *H01M 2004/021* (2013.01); *H01M 2004/027* (2013.01); *H01M 2004/028* (2013.01); *H01M 2300/0042* (2013.01)

(56) References Cited

U.S. PATENT DOCUMENTS

| | | | | |
|---|---|---|---|---|
| 2020/0176739 | A1 | 6/2020 | You et al. | |
| 2021/0320374 | A1 | 10/2021 | Lee et al. | |
| 2021/0384585 | A1* | 12/2021 | Ando .................. | H01M 50/392 |
| 2022/0021060 | A1 | 1/2022 | Yoo | |
| 2022/0247005 | A1 | 8/2022 | Cho et al. | |
| 2022/0302549 | A1* | 9/2022 | Choi ..................... | H01M 10/65 |
| 2022/0352595 | A1 | 11/2022 | Choi et al. | |
| 2022/0367971 | A1 | 11/2022 | Hong et al. | |

FOREIGN PATENT DOCUMENTS

| | | | |
|---|---|---|---|
| CN | 211670261 | U | 10/2020 |
| CN | 113675538 | A | 11/2021 |
| JP | 2000133103 | A | 5/2000 |
| JP | 2021190385 | A | 12/2021 |
| KR | 10-1224496 | B1 | 1/2013 |
| KR | 10-2017-0014309 | A | 2/2017 |
| KR | 10-2017-0142659 | A | 12/2017 |
| KR | 10-2020-0059024 | A | 5/2020 |
| KR | 10-2020-0067587 | A | 6/2020 |
| KR | 10-2020-0107213 | A | 9/2020 |
| KR | 10-2020-0143977 | A | 12/2020 |
| KR | 10-2021-0000260 | A | 1/2021 |
| KR | 10-2021-0042480 | A | 4/2021 |
| KR | 10-2021-0092039 | A | 7/2021 |
| KR | 10-2282482 | B1 | 7/2021 |
| WO | 2016132404 | A1 | 8/2016 |
| WO | 2021145706 | A1 | 7/2021 |
| WO | 2021201409 | A1 | 10/2021 |
| WO | 2021201421 | A1 | 10/2021 |
| WO | WO 2021-201421 | * | 10/2021 |

* cited by examiner

BATTERY CELL ASSEMBLY INCLUDING BUS BAR WITH FLAME BLOCKING MEMBER AND BATTERY CELL ASSEMBLY STRUCTURE

CROSS-REFERENCE TO RELATED APPLICATION(S)

This application is a National Stage Application of International Application No. PCT/KR2022/020739, filed on Dec. 19, 2022, which claims priority to Korean Patent Application No. 10-2022-0002978 filed on Jan. 7, 2022, the disclosures of which are incorporated herein by reference in their entirety.

FIELD OF DISCLOSURE

The present disclosure relates to a battery cell assembly including a bus bar with a flame blocking member and a battery cell assembly structure including the battery cell assembly. More particularly, the present disclosure relates to a battery cell assembly including a bus bar to which a flame blocking member is added to prevent thermal runaway due to ignition of a battery cell from spreading to adjacent battery cells, and a battery cell assembly structure including the battery cell assembly.

BACKGROUND

Lithium secondary batteries that may be charged and discharged are used not only as energy sources for small devices such as mobile devices, but also as energy sources for medium and large-sized devices such as electric vehicles and power storage devices with the development of technology for increasing capacity and improving safety.

As lithium secondary batteries are used as high-capacity and high-power energy sources, ensuring the safety of lithium secondary batteries has become an important issue of interest.

Because a normal charging and discharging process of a lithium secondary battery is a heating process, a temperature of the secondary battery is inevitably increased, and the temperature increase of the secondary battery may degrade the performance of a battery cell.

Also, a lithium secondary battery has a risk of explosion due to overheating, and when a flame caused by the explosion spreads to adjacent battery cells, it is difficult to suppress a fire until they are burned down. When thermal runaway occurs in a battery cell, a flame, particles, and gas venting above an ignition point may be generated, and the flame, etc. may propagate to adjacent battery cells, which may eventually lead to the explosion of the battery cell.

Accordingly, it is important to prevent additional damage due to the explosion of the battery cell by lowering the temperature and preventing the spread of the flame, sparks, etc. generated in the battery cell.

In this regard, Korean Patent Application Publication No. 2020-0059024 (related art 1) relates to a battery module having an air-cooled structure in which, because a portion where an electrode lead connected to a battery cell and a bus bar meet on a rear surface of a bus bar frame and are welded is surrounded by a thermal insulation pad, the thermal insulation pad may prevent heat caused by gas or flame from propagating to adjacent battery cells.

However, the related art 1 has a problem in that, because the thermal insulation pad is added to cover the portion where the electrode lead and the bus bar are welded, a size of the battery module is increased by a thickness of the thermal insulation pad.

Korean Patent Application Publication No. 2017-0014309 (related art 2) discloses a pouch-type secondary battery in which a flame prevention net is added to the inside or the outside of an exterior member of the pouch-type secondary battery, a battery module including a flame prevention net inside and/or outside the battery module, and a battery module including a flame prevention net on at least one surface of a sealed box in which an assembly of secondary batteries is accommodated. However, the related art 2 does not disclose a configuration for blocking propagation of a flame to an electrode lead.

Accordingly, there is a need to develop a structure in which, when a pouch-type battery cell is included, a flame may be prevented from being discharged to an electrode lead and propagating to adjacent battery cells, and an increase in an overall volume may be minimized.

SUMMARY

The present disclosure is designed to solve the problems of the related art, and therefore the present disclosure is directed to providing a battery cell assembly in which a temperature of a flame, high-temperature particles, and gas generated in an ignited battery cell may be lowered and thermal runaway may be prevented from spreading to other adjacent battery cell assemblies, and a battery cell assembly structure including the battery cell assembly.

However, technical objectives to be achieved by the present disclosure are not limited thereto, and other unmentioned technical objectives will be apparent to one of ordinary skill in the art from the description of the present disclosure.

According to the present disclosure, there is provided a battery cell assembly including at least one pouch-type battery cell comprising an electrode lead, a cell cover surrounding the at least one pouch-type battery cell and having a front open end or a rear open end, a bus bar connected to the electrode lead of the at least one pouch-type battery cell, a bus bar frame supporting the bus bar and covering the front open end or the rear open end of the cell cover where the electrode lead is located, and a flame blocking member including a mesh net formed of a material with high rigidity and high heat resistance coupled to a body of the bus bar.

Each of the at least one pouch-type battery cell may be a bidirectional battery cell which comprises a positive electrode lead and a negative electrode lead protruding in opposite directions from both ends in a length direction, wherein the cell cover has a quadrangular frame shape surrounding four outer surfaces of the pouch-type battery cell excluding a direction in which the positive electrode lead and the negative electrode lead protrude, or an n-shaped frame shape surrounding three outer surfaces of the four outer surfaces.

The flame blocking member may be integrally coupled to the bus bar.

The flame blocking member may be formed of a plurality of net structures, each of which including the mesh net formed of a material with high rigidity and high heat resistance, overlapped each other.

The flame blocking member may include a first net structure welded to one surface of the bus bar and located toward an inside of the cell cover with respect to the bus bar, and a second net structure welded to the other surface of the bus bar and located toward an outside of the cell cover with respect to the bus bar.

The bus bar may include a through-hole in the body, wherein the through-hole is covered by the flame blocking member.

The flame blocking member may have a net structure comprising a plurality of the mesh nets being stacked, and may be filled in the through-hole.

The bus bar may include a terminal portion for electrical connection with another adjacent battery cell assembly, wherein the terminal portion is a portion of the bus bar extending upward beyond the flame blocking member.

The bus bar may include a terminal portion for electrical connection with another adjacent battery cell assembly, wherein the terminal portion is located on an upper portion of the cell cover.

The bus bar and the bus bar frame may include a first surface at the front open end or the rear open end of the cell cover, and a second surface bent from the first surface on the upper portion of the cell cover, and wherein the terminal portion is disposed on the second surface.

The flame blocking member may be formed of a copper or stainless steel material.

The at least one pouch-type battery cell may be accommodated in the cell cover with a receiving portion, which is a portion where an electrode assembly is received, standing perpendicular to a ground surface, wherein the cell cover includes an upper cover portion covering an upper edge portion of the at least one pouch-type battery cell, a first side cover portion covering one side surface of the receiving portion of the at least one pouch-type battery cell, and a second side cover portion covering the other side surface of the receiving portion of the at least one pouch-type battery cell.

The cell cover may include at least one venting hole through which gas is discharged in the upper cover portion thereof.

A flame arrestor including one or more mesh nets may be coupled to the at least one venting hole.

The cell cover may include a cut-out portion formed by cutting each of upper corner portions of both ends of the cell cover in a length direction, wherein the bus bar includes a terminal portion exposed to an upper portion of the cell cover through the cut-out portion and functioning as a positive electrode terminal or a negative electrode terminal of the battery cell assembly.

According to another aspect of the present disclosure, there is provided a battery cell assembly structure including a plurality of the battery cell assemblies, a base plate on which the plurality of the battery cell assemblies are mounted, a support member disposed on side surfaces of the battery cell assemblies in a length direction, and a fixing member fixing positions of the battery cell assemblies and coupled to the support member.

According to another aspect of the present disclosure, there is provided a battery pack including the battery cell assembly.

According to another aspect of the present disclosure, there is provided an electric vehicle including the battery cell assembly.

According to an aspect of the present disclosure, a flame or high-temperature particles generated due to ignition of a battery cell may be prevented from being indiscriminately discharged in a length direction of a battery cell assembly where a bus bar is located.

In particular, according to an aspect of the present disclosure, because a flame, high-temperature particles, and high-temperature gas ejected from a battery cell may be cooled while passing through a flame blocking member, and some may be blocked from being discharged, the risk of external ignition or propagation of heat sources may be reduced.

Also, according to an aspect of the present disclosure, because a soft pouch-type battery cell is accommodated in a cell cover, the pouch-type battery cell may be protected from external impact and may be prevented from being damaged or broken during a handing process.

Also, according to an aspect of the present disclosure, when a thermal event occurs in a pouch-type battery cell, a discharge direction of gas or flame ejected from the pouch-type battery cell may be controlled to be an upward or downward direction. Accordingly, propagation of thermal runaway between adjacent battery cell assemblies may be effectively prevented.

The present disclosure may have various other effects, which will be described in each embodiment, or descriptions of effects that may be easily inferred by one of ordinary skill in the art will be omitted.

DETAILED DESCRIPTION

Now, preferred embodiments of the present disclosure will be described in detail with reference to the accompanying drawings such that the preferred embodiments of the present disclosure may be easily implemented by one of ordinary skill in the art to which the present disclosure pertains. In describing the principle of operation of the preferred embodiments of the present disclosure in detail, however, a detailed description of known functions and configurations incorporated herein will be omitted when the same may obscure the subject matter of the present disclosure.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, when a certain element is included, it does not mean that other elements are excluded, but means that such elements may be further included unless mentioned otherwise.

In addition, a description to embody elements through limitation or addition may be applied to all disclosures, unless particularly restricted, and does not limit a specific disclosure.

Also, in the description of the disclosure and the claims of the present application, singular forms are intended to include plural forms unless mentioned otherwise. Also, in the description of the disclosure and the claims of the present application, "or" includes "and" unless mentioned otherwise. Therefore, "including A or B" means three cases, namely, the case including A, the case including B, and the case including A and B.

Figure 1:
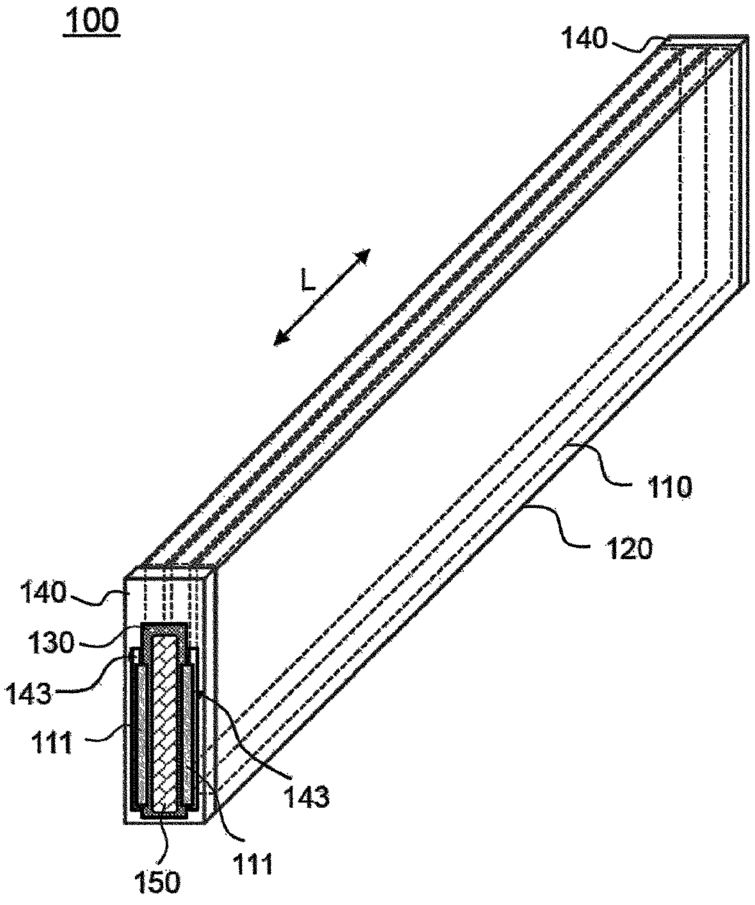
FIG. 1 is a perspective view illustrating a battery cell assembly according to a first embodiment.

FIG. 1 is a perspective view illustrating a battery cell assembly according to a first embodiment.

Referring to FIG. 1, a battery cell assembly 100 according to the present disclosure includes at least one pouch-type battery cell 110, a cell cover 120 at least partially surrounding the pouch-type battery cell 110, a bus bar 130 connected to an electrode lead of the pouch-type battery cell 110, and a bus bar frame 140 supporting the bus bar 130 and covering a front open end or a rear open end of the cell cover 120 where the electrode lead 111 is located in the cell cover 111, and a flame blocking member 150 including a mesh net formed of a material with high rigidity and high heat resistance may be coupled to a body of the bus bar 130.

The pouch-type battery cell 110 is long in a length direction L, and is a bidirectional battery cell which comprises a positive electrode lead and a negative electrode lead protruding in opposite directions from both ends in the length direction L.

Accordingly, the bus bar frame 140, the bus bar 130, and the flame blocking member 150 are provided at each of both ends in the length direction L where the electrode lead 111 extends.

The bus bar frame 140 may be formed of an insulating material, and may be coupled to both ends of the cell cover 120 in the length direction to cover an open end of the cell cover 120. The bus bar 130 is formed of a metal material having electrical conductivity, and is attached to an outer surface of the bus bar frame 140.

A slit 143 through which an electrode lead 111 passes may be formed in the bus bar frame 140, and the electrode lead 111 may pass through the slit 143, may be withdrawn out of the bus bar frame 140, may be bent to face the bus bar 130, and may be fixedly coupled to the bus bar 130 by using welding or the like.

In detail, a through-hole may be formed in the bus bar 130, and the flame blocking member 150 may be mounted on the bus bar 130 to completely cover the through-hole.

The number and shape of battery cells illustrated in FIG. 1 are merely examples, and a size and shape of the bus bar 130 may vary according to the number of battery cells 110 coupled to the bus bar 130 and a series/parallel connection state of the battery cells 110.

The flame blocking member 150 may be integrally coupled to the bus bar 130 by using welding or the like. In detail, the flame blocking member 150 may include one net structure, or may include a plurality of net structures, for example, two, or three or more net structures, which overlap each other.

Alternatively, the flame blocking member 150 may be indirectly mounted on the bus bar 130. In detail, the flame blocking member 150 may be located outside the bus bar frame 140 to which the bus bar 130 is coupled, and the flame blocking member 150 may include one, or two or more net structures. When the flame blocking member 150 includes two or more net structures, a fixing plate located between the net structures to fix positions of the net structures to be spaced apart from each other, and a case in which the net structures and the fixing plate are accommodated may be provided. Also, an insulating cover for insulation between the case and the electrode lead 111 coupled to the bus bar may be located between the bus bar frame 140 and the case. That is, the flame blocking member 150 including a net structure may be accommodated in the case, and the case may be coupled to the bus bar frame 140 to which the bus bar 130 is coupled. As such, when the flame blocking member 150 is accommodated in a separate case and then is coupled to the bus bar frame, the flame blocking member 150 may be directly mounted on the bus bar 130.

Because the flame blocking member 150 according to the present disclosure includes a plurality of net structures that overlap each other, a flame, particles, and gas generated due to ignition of the battery cell 110 may be cooled while passing through the plurality of net structures. Also, the flame or particles may be filtered by the net structures and may be prevented from being discharged to the outside.

In detail, particulate byproducts generated during ignition of the battery cell 110 are ejected as particles. When a plurality of net structures are applied to a direction in which the particles are ejected, particulate byproducts may be filtered, and thus, the particles may be prevented from being discharged to the outside.

Also, when a plurality of net structures having different mesh sizes overlap each other, the effect of filtering particulate byproducts of various sizes may be improved, and thus, additional ignition of adjacent battery cells 110 due to the particles may be prevented. Also, when passing through a net structure having a small mesh size, the area of sparks contacting the net structure is increased, thereby achieving an instantaneous cooling effect.

Furthermore, the flame blocking member 150 according to the present disclosure may prevent a flame, particles, or gas generated outside the battery cell 110 from spreading to the battery cell 110.

The flame blocking member 150 may be formed of a material with high rigidity and high heat resistance to block a flame, sparks, and gas, for example, copper or stainless steel.

Figure 2A:
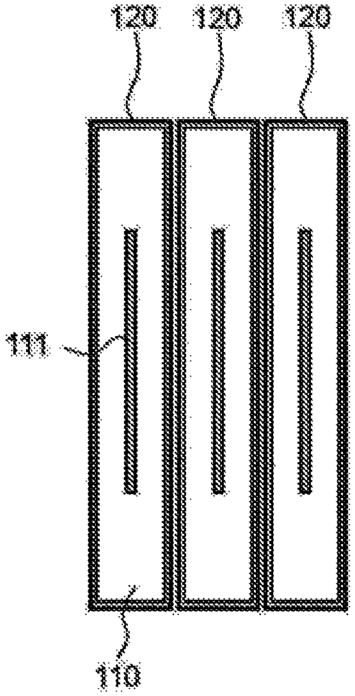
FIGS. 2A and 2B are a front view illustrating battery cells to which a cell cover is added according to the present disclosure.
Figure 2B:
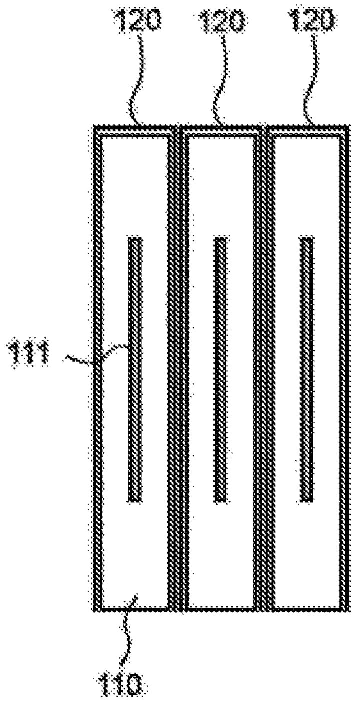

FIGS. 2A and 2B are a front view illustrating the battery cells 110 to which the cell cover 120 is added according to the present disclosure.

Referring to FIGS. 2A and 2B, the cell cover 120 shown in FIG. 2A has a quadrangular frame shape surrounding four outer surfaces of the pouch-type battery cell excluding a direction in which the electrode lead 111 protrudes, and the cell cover 120 shown in FIG. 2B has an n-shaped frame shape surrounding the remaining three outer surfaces excluding the bottom surface from among the four outer surfaces excluding the direction in which the electrode lead 111 protrudes. When the cell cover 120 having the n-shaped frame shape is provided, a separate member for mounting the battery cell assembly 100 or a heat transfer member may be applied to the bottom surface to which the cell cover 120 is not applied.

In the case of using the cell cover 120 of the present disclosure, when the pouch-type battery cell 110 is ignited, a flame or sparks may be intensively ejected in a length direction.

Accordingly, in the present disclosure, because the flame blocking member 150 is provided at each of both ends of the outer surface of the pouch-type battery cell 110 where the electrode lead 111 is located in the length direction, a flame or sparks may be prevented from being discharged to the outside of the battery cell 110. Accordingly, a series of thermal runaway may be prevented.

Figure 3:
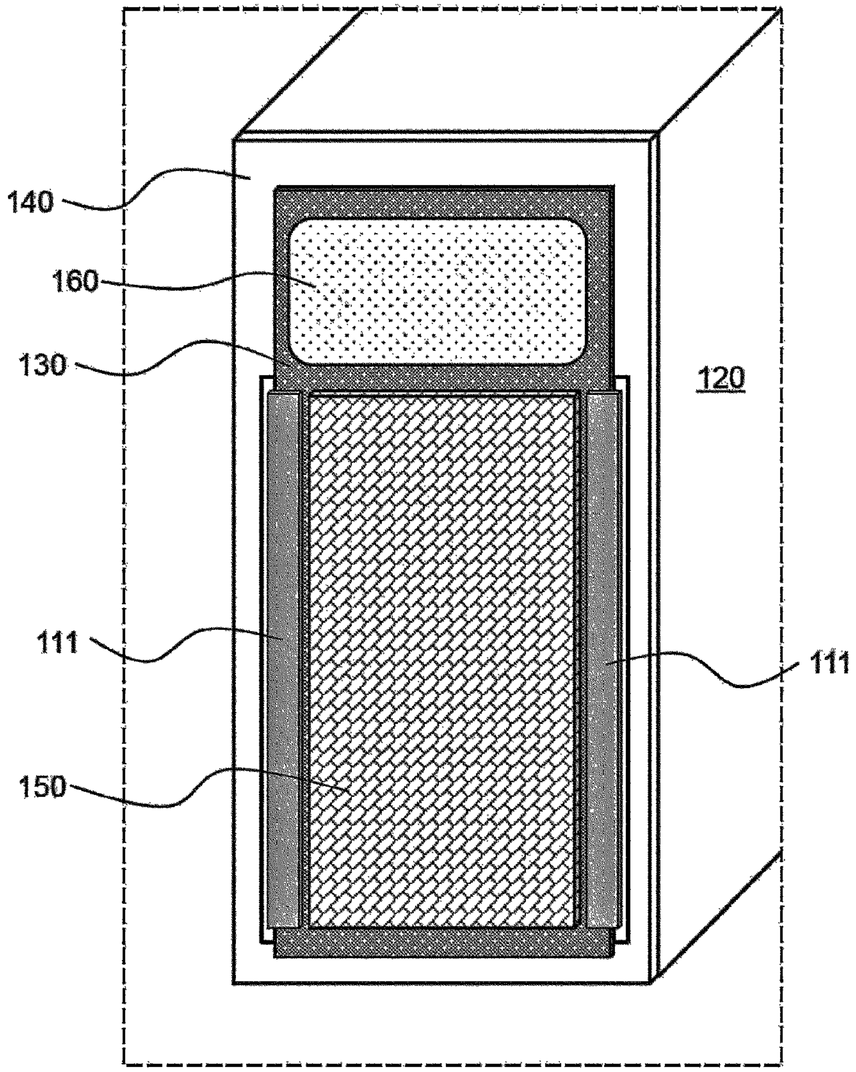
FIG. 3 is a perspective view illustrating a part of a battery cell assembly according to a second embodiment.

FIG. 3 is a perspective view illustrating a part of a battery cell assembly according to a second embodiment.

Referring to FIG. 3, the bus bar frame 140 has a flat shape, and the bus bar 130 is coupled to the bus bar frame 140. The electrode lead 111 is coupled to the bus bar 130 for electrical connection, and the flame blocking member 150 is located between electrode lead coupling portions to which the electrode lead 111 is coupled.

Figure 4:
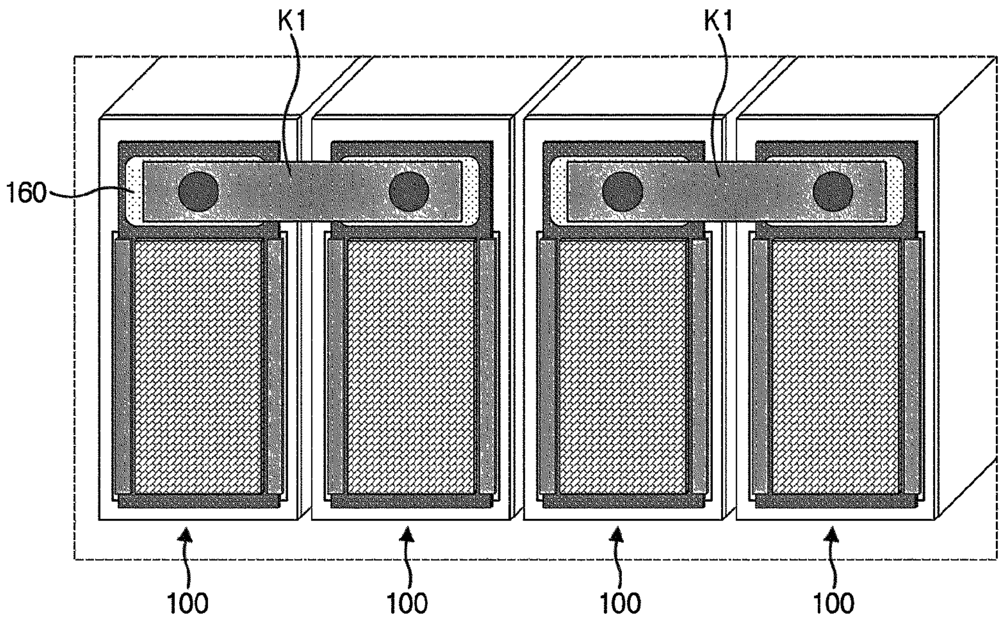
FIG. 4 is a view schematically illustrating a configuration of electrically connecting a plurality of battery cell assemblies of FIG. 3.

Also, the bus bar 130 may include a terminal portion 160 above the flame blocking member 150. The terminal portion 160 is a portion of the bus bar 130 extending upward beyond the flame blocking member 150, and is used to electrically connect different battery cell assemblies. For example, as shown in FIG. 4, adjacent battery cell assemblies 100 may be electrically connected to each other by an inter-bus bar K1.

Figure 5A:
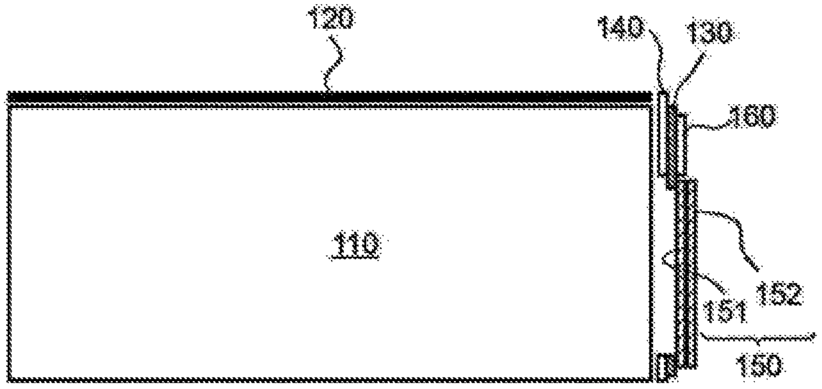
FIGS. 5A and 5B are a vertical cross-sectional view illustrating the battery cell assembly of FIG. 3.
Figure 5B:
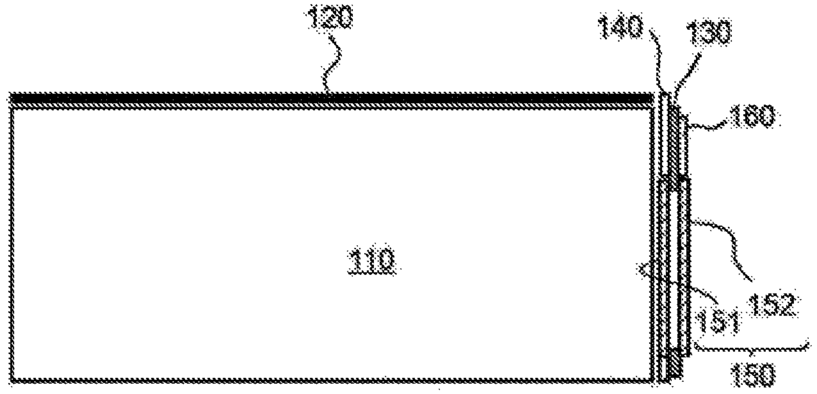

FIGS. 5A and 5B are a vertical cross-sectional view illustrating the battery cell assembly of FIG. 3.

Referring to FIGS. 5A and B, a through-hole may be formed in the bus bar 130 and the bus bar frame 140, and the flame blocking member 150 may be coupled to the bus bar 130 to cover the through-hole.

Referring to FIG. 5A, in the battery cell assembly, the flame blocking member 150 includes a first net structure 151 and a second net structure 152, and the first and second net structures 151, 152 are coupled to an outer surface of the bus bar 130 while being closely stacked on each other.

When a plurality of net structures are closely stacked as described above, an overall thickness of the flame blocking member 150 is reduced, thereby improving space utilization.

Referring to FIG. 5B, the flame blocking member 150 includes the first net structure 151 welded to one surface of the bus bar 130 and located toward the inside of the cell cover 120 with respect to the bus bar 130, and the second net structure 152 welded to the other surface of the bus bar 130 and located toward the outside of the cell cover 120 with respect to the bus bar 130.

Even in this structure, the first net structure 151, the bus bar 130, and the second net structure 152 are integrally coupled to each other.

When a plurality of net structures are spaced apart from each other as described above, a separation space may function as a storage space of filtered particulate byproducts and may reduce ejection pressure of sparks.

Figure 6:
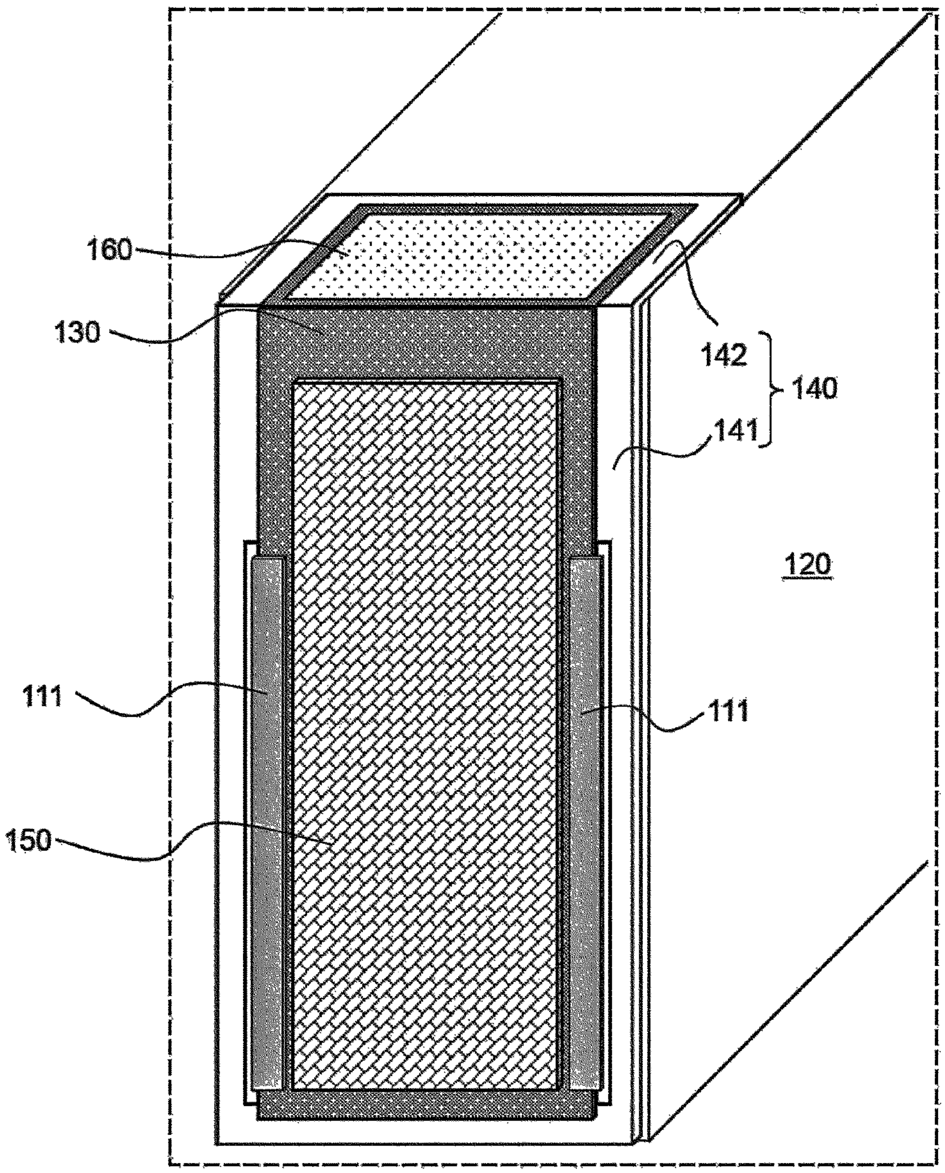
FIG. 6 is a perspective view illustrating a part of a battery cell assembly according to a third embodiment.

FIG. 6 is a perspective view illustrating a part of a battery cell assembly according to a third embodiment.

Referring to FIG. 6, the bus bar 130 and the bus bar frame 140 are bent in an L shape. In detail, the bus bar 130 and the bus bar frame 140 include a first surface 141 at a front open end or a rear open end of the cell cover 120, and a second surface 142 bent from the first surface 141 on the cell cover 120. The terminal portion 160 is disposed on the second surface 142.

Because the terminal portion 160 is provided on the second surface 142, the area of the flame blocking member 150 may be wide, thereby further ensuring safety.

Figure 7:
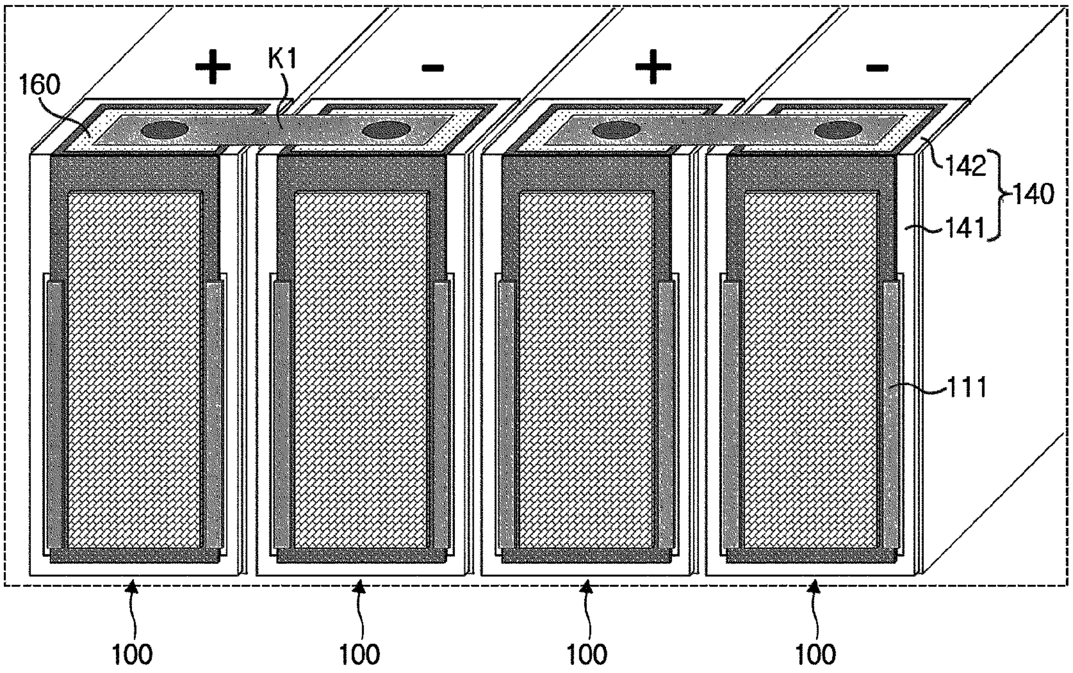
FIG. 7 is a view schematically illustrating a configuration of electrically connecting a plurality of battery cell assemblies of FIG. 6.

Also, as shown in FIG. 7, the battery cell assemblies 100 may be electrically connected to each other by using the inter-bus bar K1 on the cell cover 120. In this case, an assembly process between the battery cell assemblies 100 may be easier, and a battery cell assembly structure may be more compact.

Figure 8A:
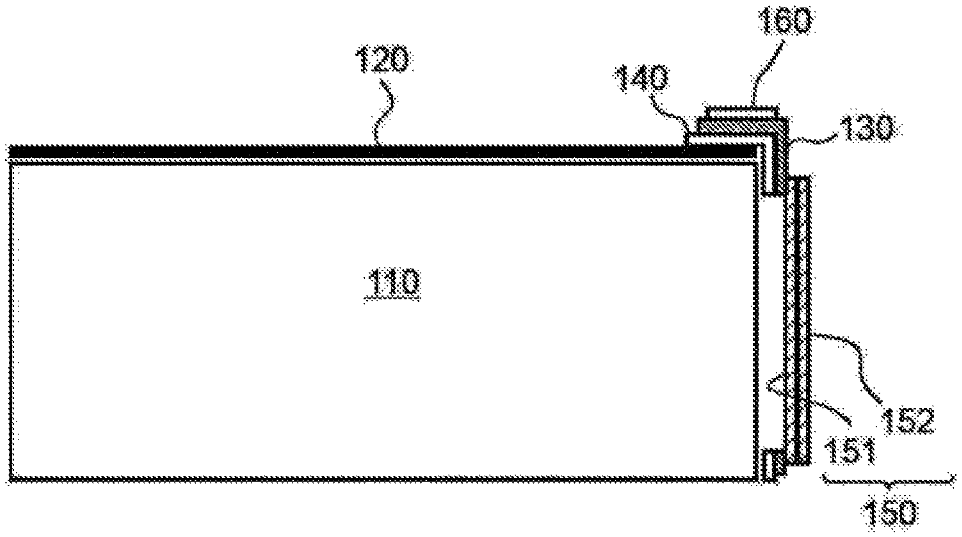
FIGS. 8A and 8B are a vertical cross-sectional view illustrating the battery cell assembly of FIG. 6.
Figure 8B:
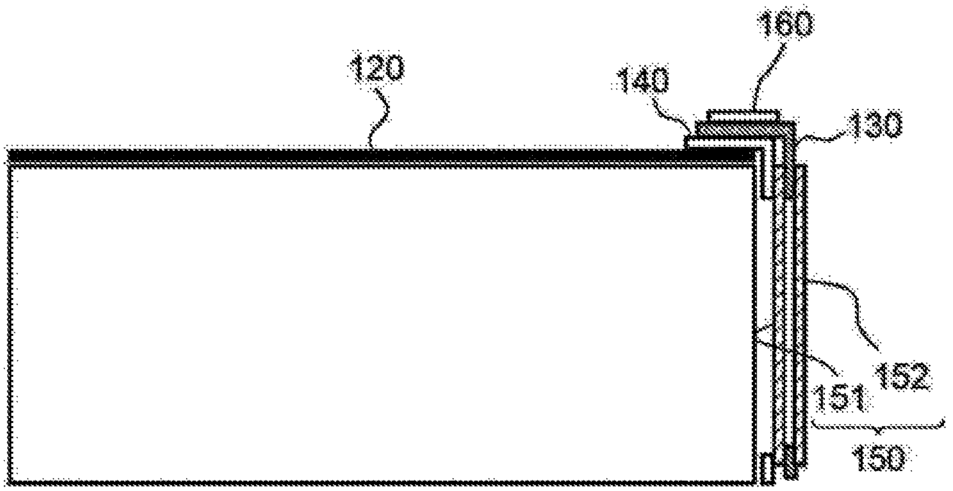

FIGS. 8A and 8B are a vertical cross-sectional view illustrating the battery cell assembly of FIG. 6.

Referring to FIG. 8A, the terminal portion 160 is formed on the second surface 142, and in the battery cell assembly 100, the flame blocking member 150 includes the first net structure 151 and the second net structure 152 and the first and second net structures 151, 152 are coupled to an outer surface of the bus bar 130 while being closely stacked on each other.

When a plurality of net structures are closely stacked as described above, an overall thickness of the flame blocking member may be reduced, thereby improving space utilization.

Referring to FIG. 8B, in the battery cell assembly, the flame blocking member 150 includes the first net structure 151 and the second net structure 152, and the first net structure 151 is coupled to an inner surface of the bus bar 130 and the second net structure 152 is coupled to an outer surface of the bus bar 130 so that the first net structure 151 and the second net structure 152 are spaced apart from each other by a thickness of the bus bar 130. Even in this structure, the first net structure, the bus bar, and the second net structure are integrally coupled to each other.

When a plurality of net structures are spaced apart from each other as described above, a separation space may function as a storage space of filtered particulate byproducts, and may reduce ejection pressure of sparks.

Figure 9:
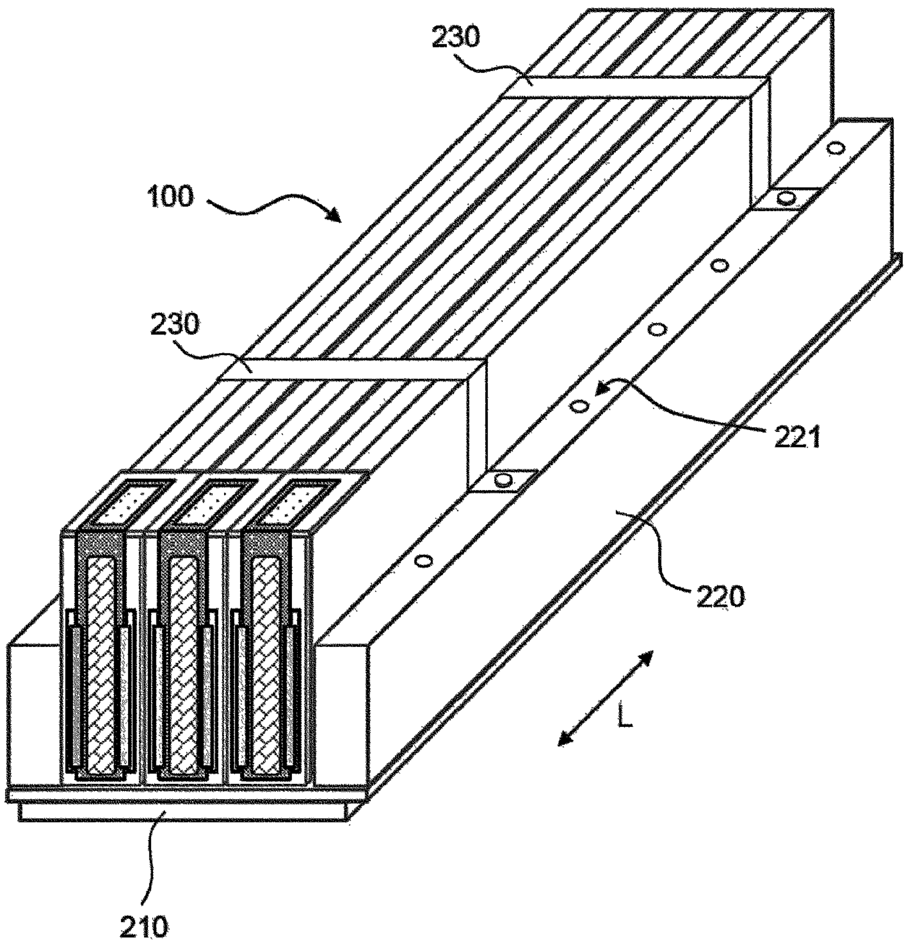
FIG. 9 is a perspective view illustrating a battery cell assembly structure according to an embodiment of the present disclosure.

FIG. 9 is a perspective view illustrating a battery cell assembly structure according to the present disclosure.

Referring to FIG. 9, three battery cell assemblies 100 are mounted on a top surface of a base plate 210, and a support member 220 is disposed on side surfaces of the battery cell assemblies 100 in the length direction L. A fixing member 230 for fixing positions of the battery cell assemblies 100 is added to partially surround top and side surfaces of the battery cell assemblies and coupled to the support member 220.

Alternatively, instead of the support member 220 of FIG. 9, a crossbeam may be located at the position of the support member 220, to achieve a rigidity reinforcing effect, or the battery cell assembly structure may be located between chasses of a device to which the battery cell assembly structure is attached.

A plurality of coupling portions 221 may be formed on the support member 220, and the fixing member 230 may include a metal band or a cover having a large area. The fixing member 230 may be coupled to the coupling portion 221 by using bolt fastening or welding.

Alternatively, when separate structures such as the fixing member 230 and the coupling portion 221 are not included, the battery cell assembly structure may be configured by disposing a compression pad or a thermally conductive resin between the battery cell assembly structure and a chassis and directly fixing battery cell assemblies.

The number of battery cell assemblies illustrated in FIG. 9 is merely an example, and when necessary, the number of battery cell assemblies may be freely changed and applied.

Figure 10:
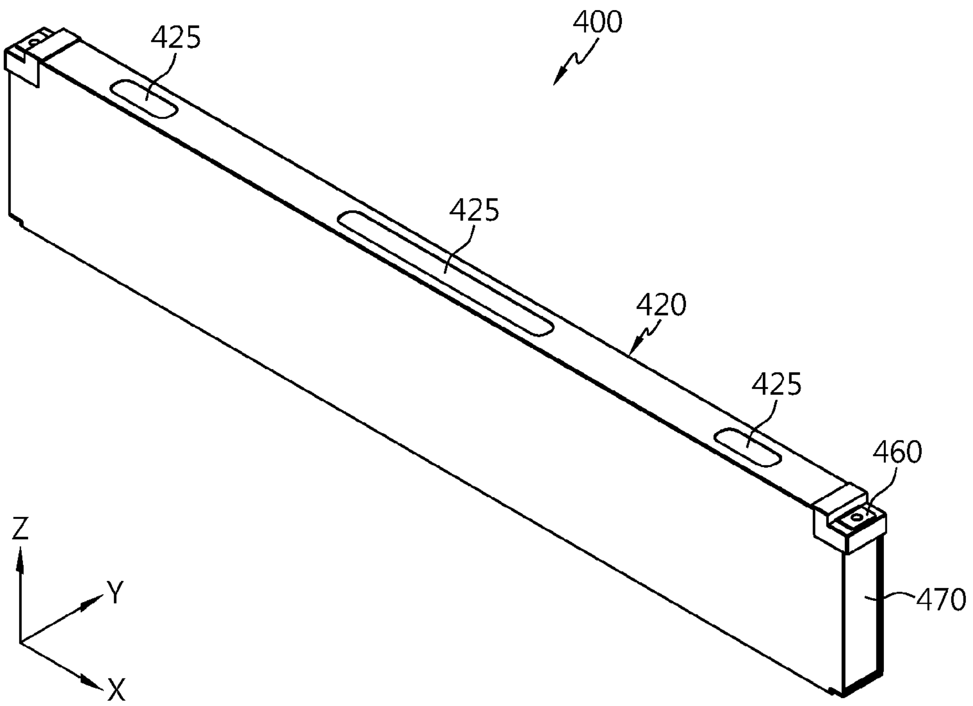
FIG. 10 is a perspective view illustrating a battery cell assembly according to a fourth embodiment of the present disclosure.
Figure 11:
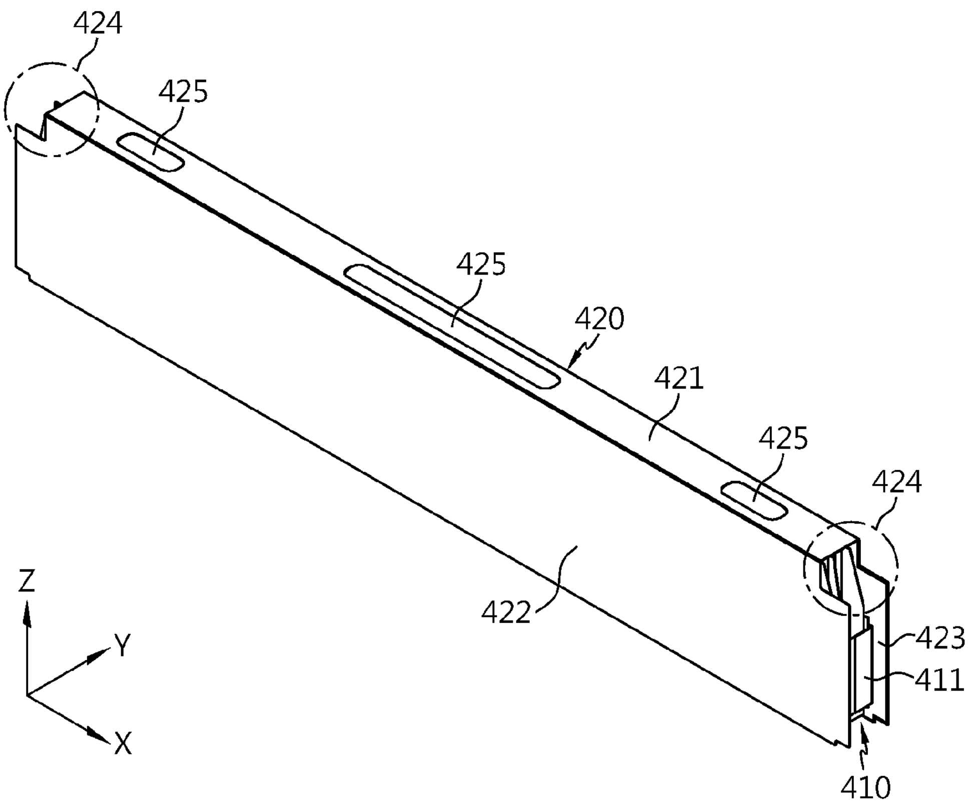
FIG. 11 is a perspective view illustrating a cell cover of FIG. 10 and a pouch-type battery cell surrounded by the cell cover.
Figure 12:
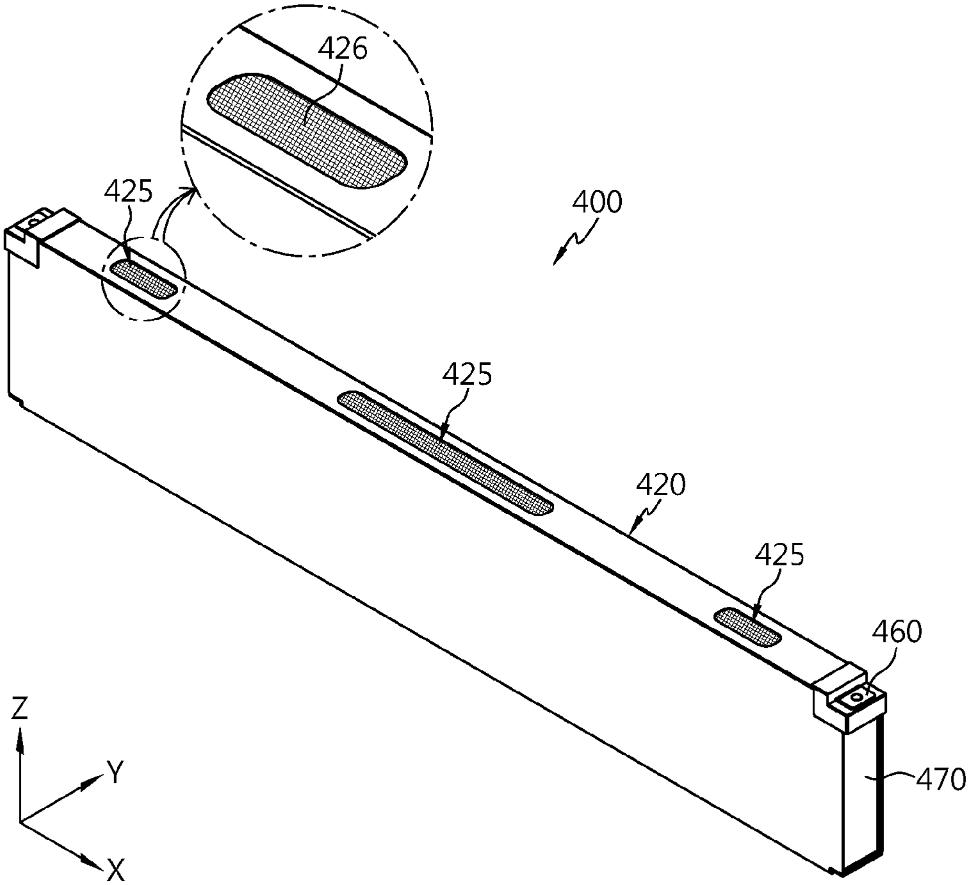
FIG. 12 is a view illustrating a modified example of a venting hole portion of the cell cover of FIG. 10.
Figure 13:
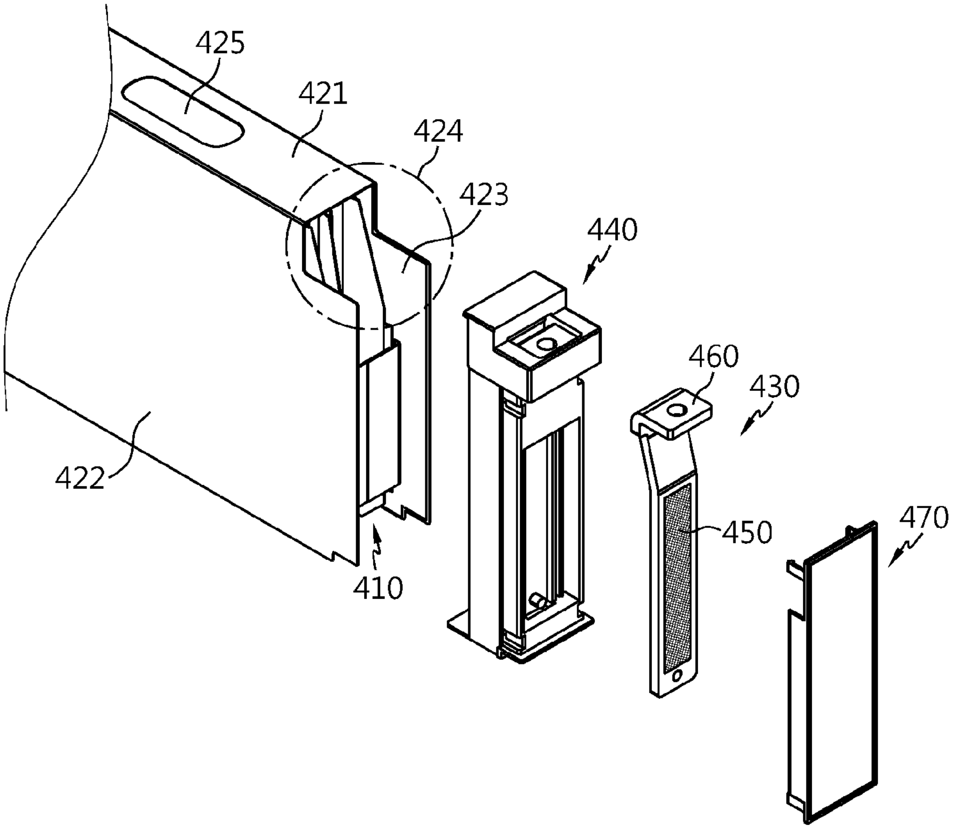
FIG. 13 is an exploded view illustrating elements of the battery cell assembly of FIG. 10.
Figure 14:
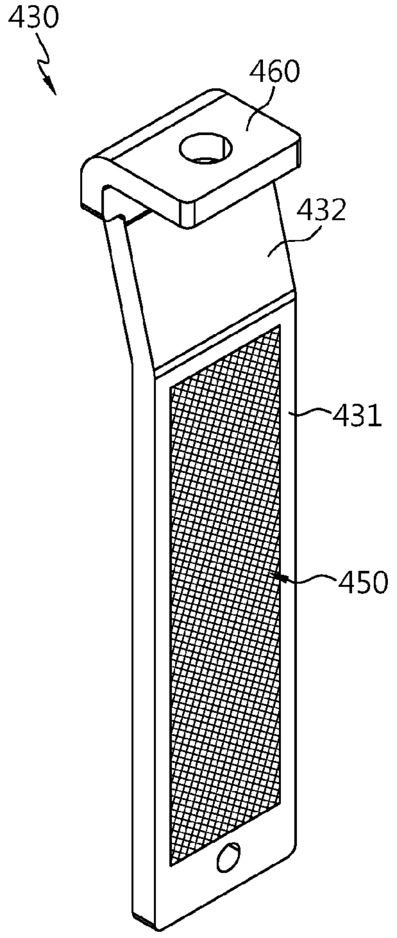
FIG. 14 is a perspective view illustrating a bus bar to which a flame blocking member of FIG. 13 is applied.
Figure 15:
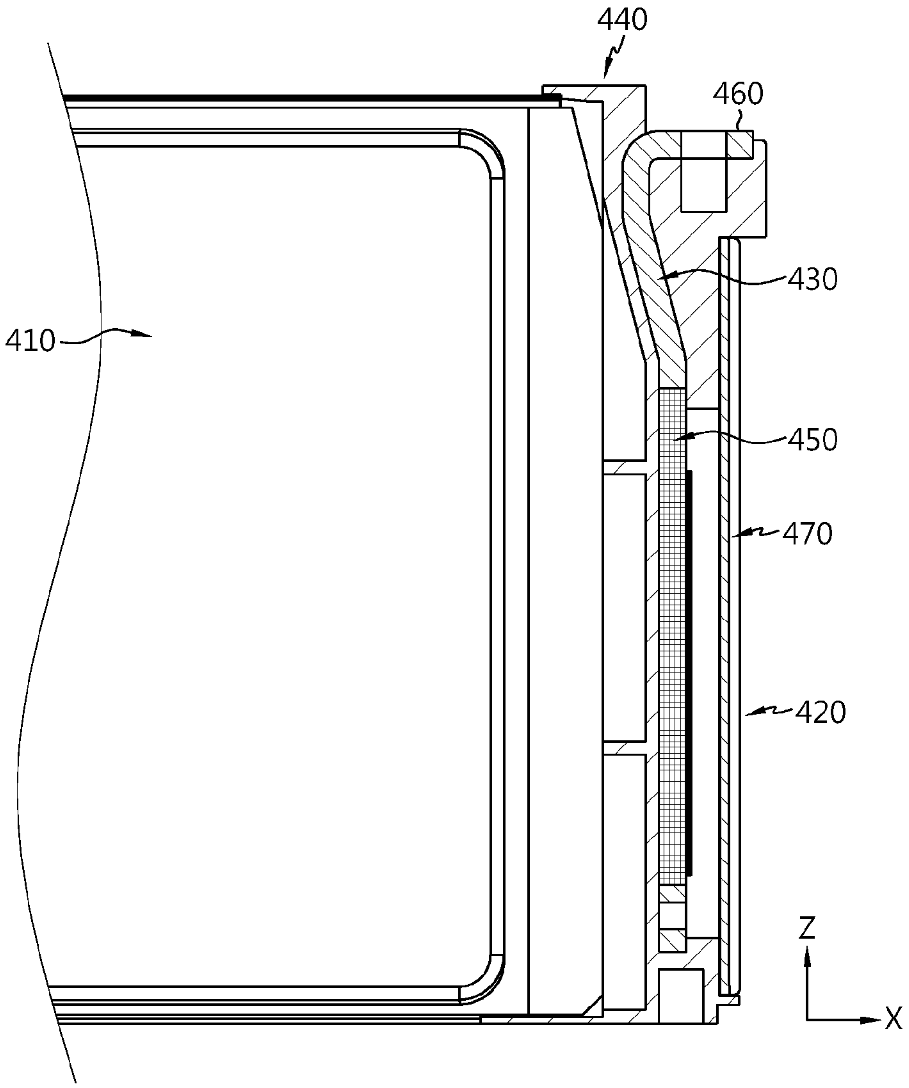
FIG. 15 is a cross-sectional view illustrating a portion of the battery cell assembly of FIG. 10.

FIG. 10 is a perspective view illustrating a battery cell assembly according to a fourth embodiment of the present disclosure. FIG. 11 is a perspective view illustrating a cell cover of FIG. 10 and a pouch-type battery cell surrounded by the cell cover. FIG. 12 is a view illustrating a modified example of a venting hole portion of the cell cover of FIG. 10. FIG. 13 is an exploded view illustrating elements of the battery cell assembly of FIG. 10. FIG. 14 is a perspective view illustrating a bus bar to which a flame blocking member of FIG. 13 is applied. FIG. 15 is a cross-sectional view illustrating a portion of the battery cell assembly of FIG. 10.

Referring to FIGS. 10 to 15, a battery cell assembly 400 according to the fourth embodiment of the present disclosure includes a pouch-type battery cell 410, a cell cover 420 surrounding the pouch-type battery cell 410, a bus bar 430 including a flame blocking member 450, a bus bar frame 440, and a fire-resistant insulating cover 470.

As shown in FIG. 11, the cell cover 420 may partially surround the pouch-type battery cell 410.

An exterior member of the pouch-type battery cell 410 is formed of a soft material, and thus, the pouch-type battery cell 410 is more vulnerable to external impact and lower hardness than the can-type battery cell. Accordingly, when the pouch-type battery cell 410 is accommodated in a module case (not shown) of a battery module or a pack case (not shown) of a battery pack by omitting the module case, it is difficult to ensure safety or fixability against impact. However, in the present disclosure, because the pouch-type battery cell 410 may be surrounded by the cell cover 420 and then directly accommodated in the module case or the pack case, a stacked state may be stably maintained.

The cell cover 420 may partially surround the pouch-type battery cell 410 so that at least a side of the pouch-type battery cell 410 is exposed to the outside. For example, the cell cover 420 may surround only a portion of the pouch-type battery cell 410, without completely surrounding the pouch-type battery cell 410.

For example, the pouch-type battery cell 410 may be accommodated in the cell cover 420 with a receiving portion, which is a portion of the pouch-type battery cell 410 in which an electrode assembly is received, standing perpendicular to the ground surface. As shown in FIG. 11, the cell cover 420 may surround the pouch-type battery cell 410 so that a lower edge portion of the pouch-type battery cell 410 and an electrode lead are exposed.

In other words, the pouch-type battery cell 410 may be formed in a substantially hexahedral shape. Electrode leads 411, that is, a negative electrode lead and a positive electrode lead, may be respectively formed on two surfaces (front and rear surfaces in an ±X direction) of six surfaces. The cell cover 420 may surround at least a part of three surfaces (e.g., a top surface, a left surface, and a right surface) of the remaining four surfaces excluding the two surfaces of the pouch-type battery cell 410 on which the electrode leads are formed.

In more detail, as shown in FIG. 11, the cell cover 420 may include an upper cover portion 421, a first side cover portion 422, and a second side cover portion 423.

The upper cover portion 421 may cover an upper edge portion of the pouch-type battery cell 410. The upper cover portion 421 may contact or be spaced apart from the upper edge portion of the pouch-type battery cell 410.

The first side cover portion 422 may extend long downward from an edge that extends in a longitudinal direction (X direction) of the upper cover portion 421, to cover one side surface of a receiving portion of the pouch-type battery cell 410. The receiving portion may be a portion of a pouch exterior member in which an electrode assembly is received. For example, when one pouch-type battery cell 410 is accommodated in the cell cover 420, the first side cover portion 422 may cover a left surface of the receiving portion of the pouch-type battery cell 410.

The second side cover portion 423 may extend long downward from the other edge that extends in the longitudinal direction (X direction) of the upper cover portion 421, to cover the other side surface of the receiving portion of the pouch-type battery cell 410. Also, the second side cover portion 423 may be spaced apart from the first side cover portion 422 by a certain interval and may be substantially symmetrical to the first side cover portion 422. For example, when one pouch-type battery cell 410 is accommodated in the cell cover 420, the second side cover portion 423 may cover a right surface of the receiving portion of the pouch-type battery cell 410.

In this embodiment, an inner space may be defined by the upper cover portion 421, the first side cover portion 422, and the second side cover portion 423. The cell cover 420 may accommodate one or more battery cells 410 in this defined inner space.

The cell cover 420 may be formed of any of various materials, to ensure rigidity. In particular, the cell cover 420 may be formed of a metal material. When the cell cover 420 is formed of a metal material, a stacked state of the pouch-type battery cells 410 may be more stably maintained, and the pouch-type battery cells 410 may be more safely protected from external impact. In particular, the cell cover 420 may be formed of a steel material, especially, a stainless steel (SUS) material. For example, the cell cover 420 may be entirely formed of a stainless steel (SUS) material.

As such, when the cell cover 420 is formed of a steel material, because the cell cover 420 has excellent mechanical strength or rigidity, a stacked state of the pouch-type battery cells 410 may be more stably supported. Also, in this case, damage or breakage of the pouch-type battery cell 410 from external impact, for example, a needle body, may be more effectively prevented. Also, in this case, handling of the pouch-type battery cell 410 may be easier.

The cell cover 420 may surround the pouch-type battery cell 410 as shown in FIG. 11, and may be directly seated on a bottom surface (not shown) of the module case or a bottom surface (not shown) of the pack case. In this case, because the cell cover 420 is formed of a metal material having excellent rigidity such as steel, especially an SUS material, a self-sustaining state may be more stably maintained. Accordingly, in this case, a standing state of the pouch-type battery cells 410 may be more reliably supported.

Also, because the lower edge portion of the pouch-type battery cell 410 may directly contact the bottom surface of the module case or the bottom surface of the pack case through an open lower end of the cell cover 420, the pouch-type battery cells 410 may be more directly and effectively cooled. That is, heat emitted from the pouch-type battery cell 410 may be directly transferred to the module case or the pack case, thereby improving cooling performance. In this case, a thermally conductive resin may be located between the lower edge portion of the pouch-type battery cell 410 and the bottom surface of the module case or the bottom surface of the pack case, to increase thermal conductivity.

Also, the cell cover 420 may include a venting hole 425. The venting hole 425 may allow gas generated in the pouch-type battery cell 410 surrounded by the cell cover 420 to be discharged to the outside of the cell cover 420. The venting hole 425 may be formed at any of various positions of the cell cover 420. For example, the venting hole 425 may be formed in the upper cover portion 421, as shown in FIGS. 10 and 11. The venting hole 425 may be formed in an elliptical shape, a circular shape, a quadrangular shape, a diamond shape, or a rhombus shape.

Also, a plurality of venting holes 425 may be formed in the cell cover 420. For example, a plurality of venting holes 425 may be formed in the upper cover portion 421 in a left-right direction and a front-back direction.

According to this embodiment of the present disclosure, when a flame or gas is discharged through the venting hole 425, a discharge direction may be controlled. For example, as in the embodiment, when the venting hole 425 is formed in the upper cover portion 421, gas or flame may be discharged upward (Z direction) without being directed to other pouch-type battery cells 410 or other battery cell assemblies 400 stacked in a horizontal direction. Accordingly, propagation of gas or flame between cells may be effectively prevented.

In particular, when a fire extinguishing agent or the like is located over the cell cover 420, this upward venting configuration may be more effective in suppressing a fire. For example, assuming that a fire extinguishing tank (not shown) in which a fire extinguishing agent is accommodated is located over the cell cover 420, when a flame or gas is discharged upward from the cell cover 420, the fire extinguishing agent may leak out of the fire extinguishing tank, to prevent or delay a fire.

In FIG. 12, the cell cover, as a modified example of the cell cover of FIG. 10, may include a flame arrestor 426 coupled to the venting hole. The flame arrestor 426 may include one or more mesh nets formed of a metal material with high rigidity and high heat resistance. For example, the flame arrestor 426 may include a plurality of mesh nets having different hole sizes, and the plurality of mesh nets may have a stacked structure. The plurality of mesh nets (see FIG. 12) having smaller hole sizes may be sequentially disposed in a height direction. In this embodiment, the emission of a flame and high-temperature particles may be minimized and a temperature of venting gas may be effectively lowered.

The bus bar frame 440 may support the bus bar 430 and may be coupled to the cell cover 420. For example, referring to FIGS. 10 and 13, the bus bar frame 440 may be coupled to each of the front open end and the rear open end of the cell cover 420. For example, the bus bar frame 440 may be fixedly coupled to each of the front open end or the rear open end of the cell cover 420 through any of various fastening methods such as adhesion, welding, fitting, hook, bolting, or riveting.

Also, the bus bar frame 440 may be formed of an electrically insulating material, and may cover the front open end or the rear open end of the cell cover 420. The bus bar 430 may be counted on an outer surface of the bus bar frame 440. Also, the bus bar frame 440 may include a slit through which the electrode lead 411 may pass, and the electrode lead 411 may pass through the slit, may be withdrawn out of the bus bar frame 440, and may be fixedly coupled to the bus bar 430 by using welding or the like.

The bus bar 430 connected to the electrode lead 411 may be shielded by the insulating cover 470 so as not to be exposed to the outside. The insulating cover 470 may be formed of a flame retardant material having electrical insulation and excellent fire resistance.

In particular, the bus bar 430 may include the flame blocking member 450.

The flame blocking member 450 may be integrally formed with the bus bar 430, as shown in FIG. 14. For example, the bus bar 430 and the flame blocking member 450 may be integrally manufactured by welding or bonding. The flame blocking member 450 may have a net structure in which one or more mesh nets formed of a material with high rigidity and high heat resistance (e.g., copper or stainless) are stacked.

The bus bar 430 may include a through-hole, and the flame blocking member 450 may be applied to the inside of the through-hole. In other words, the bus bar 430 may be provided so that the through-hole is filled with the flame blocking member 450 having a net structure in which multiple mesh nets are stacked. That is, the flame blocking member may be filled in the through-hole of the bus bar 430.

According to the bus bar 430 including the flame blocking member 450, when a thermal event such as heat/fire of the pouch-type battery cell 410 occurs, a flame or high-temperature gas may be cooled while passing through the flame blocking member 450. Also, a flame or high-temperature particles may be filtered by the flame blocking member 450, and thus, may be prevented from being discharged. Accordingly, according to the embodiment of the present disclosure, at least a flame or high-temperature particles may be prevented from being discharged in the length direction (±direction) of the battery cell assembly 400.

Also, the bus bar 430 according to the present embodiment includes an upper end that is bent in the horizontal direction. The bent upper end may function as a (positive electrode or negative electrode) terminal portion 460 of the battery cell assembly 400. In the battery cell assembly 400 according to the present embodiment, because the positive electrode terminal portion and the negative electrode terminal portion are each located at an upper corner of the cell cover 420, when a cable or a connection means is mounted on the terminal portion 460 of the battery cell assembly 400, the cable or the connection means may be located on an upper portion of the battery cell assembly 400. In this case, because a space may be secured on front and rear sides of the battery cell assembly 400, for example, the battery cell assembly may be easily accommodated in the module case or the pack case.

Referring back to FIGS. 11 to 13, the cell cover 420 includes a cut-out portion 424 at each of both ends in the length direction. The cut-out portion 424 may be formed by cutting each of upper corner portions of both ends of the cell cover 420 in the length direction.

In the cell cover 420 including the cut-out portion 424, the bus bar frame 440 may be further pushed into the front open end or the rear open end of the cell cover 420, and the terminal portion 430 of the bus bar 430 may be exposed to an upper portion of the cell cover 420 through the cut-out portion 424.

Also, the bus bar 430 according to the present embodiment may include a lead coupling portion 431 vertically extending when being erected on the ground and to which an electrode lead is attached, a bent portion 432 obliquely extending at a certain angle from the lead coupling portion 431, and the terminal portion 460 horizontally extending from an upper end of the bent portion 432 in a direction away from the bent portion 432.

According to this structure of the bus bar, the electrode lead 411 and the bus bar 430 may be connected in a state where the bus bar frame 440 and the bus bar 430 are inserted into the cell cover 420 as much as possible, and the terminal portion 460 of the bus bar 430 may face the upper portion of the cell cover 420. Accordingly, the battery cell assembly 400 of the present disclosure may have an overall length less than that of the battery cell assembly 100 according to the above embodiment, even when the pouch-type battery cell 410 of the same size is used.

A battery cell assembly structure according to another embodiment of the present disclosure includes a plurality of battery cell assemblies 400 that are stacked in one direction.

Figure 16:
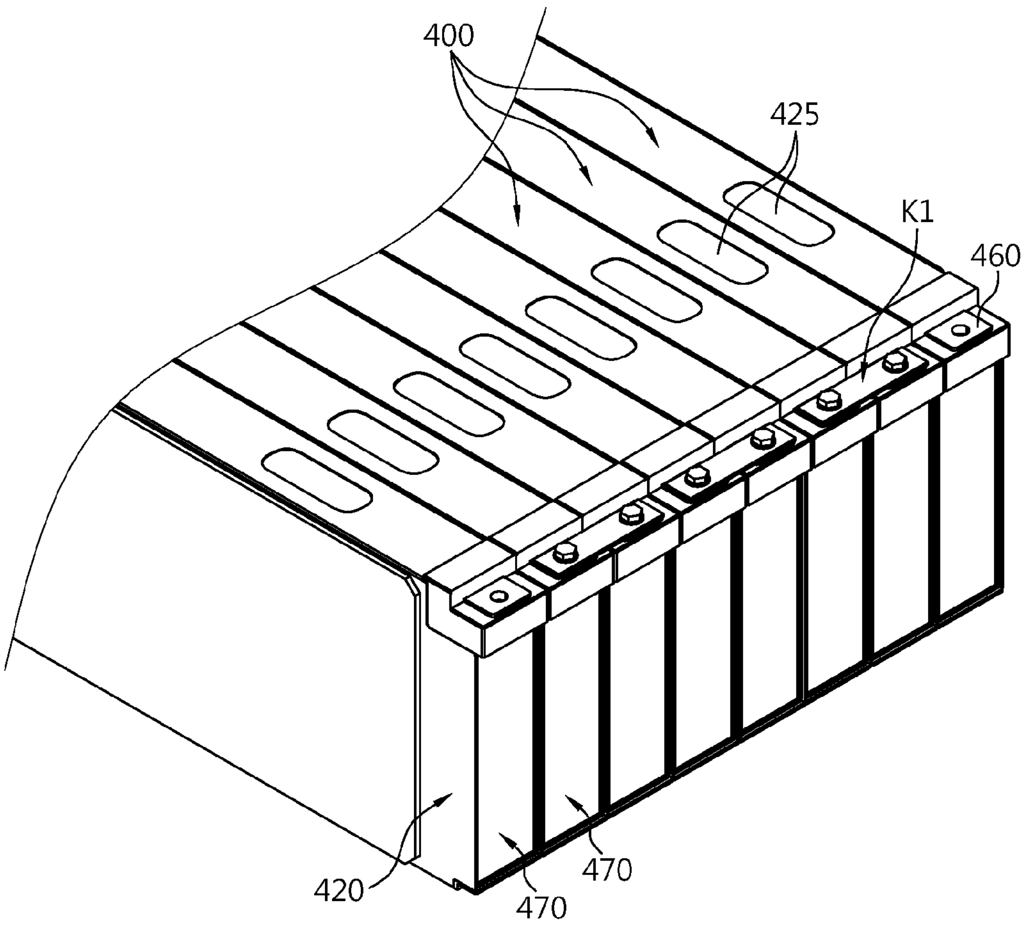
FIG. 16 is a view illustrating a portion of a battery cell assembly structure including the battery cell assembly of FIG. 10.

Adjacent battery cell assemblies 400 may be electrically connected to each other by the inter-bus bar K1. For example, as shown in FIG. 16, adjacent battery cell assemblies 400 may be stacked so that positive electrode terminal portions and negative electrode terminal portions are located in opposite directions. When the battery cell assemblies 400 are stacked in this pattern and the positive and the negative electrode terminal portions of adjacent battery cell assemblies 420 are connected by the inter-bus bar K1, the battery cell assemblies 400 may be connected in series. In this case, the pouch-type battery cells 410 included in each battery cell assembly 400 may be connected in parallel, and the battery cell assemblies 400 may be connected in series.

A battery module according to the present disclosure may include a plurality of battery cell assemblies 400 that are stacked and a module case in which the plurality of battery cell assemblies are received.

Also, a battery pack according to the present disclosure may include the battery modules that are connected in series and/or in parallel, and a pack case including the battery modules. In another example, the battery pack according to the present disclosure may omit a battery module unit, and may have a cell-to-pack structure in which the stacked plurality of battery cell assemblies 400 are directly accommodated in the pack case.

A vehicle according to the present disclosure may include the battery pack according to the present disclosure. The vehicle according to the present disclosure may include a certain vehicle using electricity as a driving source such as an electric vehicle or a hybrid vehicle. Also, the vehicle according to the present disclosure may include various other elements included in a vehicle, for example, a vehicle body or a motor, in addition to the battery pack according to the present disclosure.

It will be understood by one of ordinary skill in the art that when terms indicating directions such as upper, lower, left, right, front, and rear are used, these terms are only for convenience of explanation and may vary according to a position of a target object, a position of an observer, etc.

Although the embodiments of the present disclosure have been illustrated and described above, the present disclosure is not limited to the above-described specific embodiments. Various modified embodiments may be made by one of ordinary skill in the art without departing from the scope of the present disclosure as claimed in the claims.

What is claimed is:

1. A battery cell assembly comprising:

at least one pouch-type battery cell including an electrode lead;

a cell cover surrounding the at least one pouch-type battery cell and having a front open end or a rear open end;

a bus bar connected to the electrode lead of the at least one pouch-type battery cell;

a bus bar frame supporting the bus bar and covering the front open end or the rear open end of the cell cover where the electrode lead is located; and a flame blocking member comprising a mesh net formed of a material with high rigidity and high heat resistance-is coupled to a body of the bus bar, wherein the bus bar comprises a through-hole in the body, wherein the through-hole is covered by the flame blocking member.

2. The battery cell assembly according to claim 1, wherein each of the at least one pouch-type battery cell is a bidirectional battery cell which comprises a positive electrode lead and a negative electrode lead protruding in opposite directions from both ends in a length direction, wherein the cell cover has a quadrangular frame shape surrounding four outer surfaces of the pouch-type battery cell excluding a direction in which the positive electrode lead and the negative electrode lead protrude, or an n-shaped frame shape surrounding three outer surfaces of the four outer surfaces.

3. The battery cell assembly according to claim 1, wherein the flame blocking member is integrally coupled to the bus bar.

4. The battery cell assembly according to claim 1, wherein the flame blocking member is formed of a plurality of net structures, each of which comprising the mesh net formed of a material with high rigidity and high heat resistance, overlapping each other.

5. The battery cell assembly according to claim 1, wherein the flame blocking member comprises:

a first net structure welded to one surface of the bus bar and located toward an inside of the cell cover with respect to the bus bar; and a second net structure welded to an other surface of the bus bar and located toward an outside of the cell cover with respect to the bus bar.

6. The battery cell assembly according to claim 1, wherein the flame blocking member has a net structure comprising a plurality of the mesh nets being stacked, and is filled in the through-hole.

7. The battery cell assembly according to claim 1, wherein the bus bar comprises a terminal portion for electrical connection with another adjacent battery cell assembly, wherein the terminal portion is a portion of the bus bar extending upward beyond the flame blocking member.

8. The battery cell assembly according to claim 1, wherein the bus bar comprises a terminal portion for electrical connection with another adjacent battery cell assembly, wherein the terminal portion is located on an upper portion of the cell cover.

9. The battery cell assembly according to claim 8, wherein the bus bar and the bus bar frame comprise a first surface at the front open end or the rear open end of the cell cover, and a second surface bent from the first surface on the upper portion of the cell cover, and wherein the terminal portion is disposed on the second surface.

10. The battery cell assembly according to claim 1, wherein the flame blocking member is formed of a copper or stainless steel material.

11. The battery cell assembly according to claim 1, wherein the at least one pouch-type battery cell is accommodated in the cell cover with a receiving portion, which is a portion where an electrode assembly is received, standing perpendicular to a ground surface, wherein the cell cover comprises:

an upper cover portion covering an upper edge portion of the at least one pouch-type battery cell;

a first side cover portion covering one side surface of the receiving portion of the at least one pouch-type battery cell; and a second side cover portion covering an other side surface of the receiving portion of the at least one pouch-type battery cell.

12. The battery cell assembly according to claim 11, wherein the cell cover comprises at least one venting hole, through which gas is discharged, in the upper cover portion thereof.

13. The battery cell assembly according to claim 12, wherein the cell cover further comprises a flame arrestor including one or more mesh nets and coupled to the at least one venting hole.

14. The battery cell assembly according to claim 1, wherein the cell cover comprises a cut-out portion formed by cutting each of upper corner portions of both ends of the cell cover in a length direction, wherein the bus bar comprises a terminal portion exposed to an upper portion of the cell cover through the cut-out portion and functioning as a positive electrode terminal or a negative electrode terminal of the battery cell assembly.

15. A battery cell assembly structure comprising:

a plurality of the battery cell assemblies according to claim 1;

a base plate on which the plurality of the battery cell assemblies are mounted;

a support member disposed on side surfaces of the battery cell assemblies in a length direction; and a fixing member fixing positions of the battery cell assemblies and coupled to the support member.

16. A battery pack comprising the battery cell assembly structure according to claim 15.

17. An electric vehicle comprising the battery cell assembly structure according to claim 15.

* * * * *